(12) United States Patent
Bujard

(10) Patent No.: US 7,510,765 B2
(45) Date of Patent: *Mar. 31, 2009

(54) REDUCING PIGMENTS

(75) Inventor: Patrice Bujard, Reinach (CH)

(73) Assignee: Ciba Specialty Chemicals Corporation, Tarrytown, NY (US)

(*) Notice: Subject to any disclaimer, the term of this patent is extended or adjusted under 35 U.S.C. 154(b) by 580 days.

This patent is subject to a terminal disclaimer.

(21) Appl. No.: 10/530,098

(22) PCT Filed: Oct. 6, 2003

(86) PCT No.: PCT/EP03/50690

§ 371 (c)(1),
(2), (4) Date: Apr. 1, 2005

(87) PCT Pub. No.: WO2004/035694

PCT Pub. Date: Apr. 29, 2004

(65) Prior Publication Data

US 2005/0287090 A1    Dec. 29, 2005

(30) Foreign Application Priority Data

Oct. 16, 2002    (EP)    ................... 02405887

(51) Int. Cl.
*B32B 5/16*    (2006.01)
(52) U.S. Cl. .................. 428/403; 427/215; 427/218; 427/301; 424/63
(58) Field of Classification Search .................. None
See application file for complete search history.

(56) References Cited

U.S. PATENT DOCUMENTS

| 4,978,394 | A | 12/1990 | Ostertag et al. | ............. 106/404 |
|---|---|---|---|---|
| 5,540,769 | A | 7/1996 | Franz et al. | .................. 106/415 |
| 5,766,335 | A | 6/1998 | Bujard et al. | ................ 106/404 |
| 5,858,078 | A * | 1/1999 | Andes et al. | ................. 106/437 |
| 6,569,529 | B1 * | 5/2003 | Phillips et al. | ............... 428/403 |
| 6,586,098 | B1 * | 7/2003 | Coulter et al. | .............. 428/403 |
| 6,620,233 | B1 | 9/2003 | Seeger et al. | ................. 106/417 |
| 2004/0131776 | A1 | 7/2004 | Weinert | ................... 427/255.7 |

FOREIGN PATENT DOCUMENTS

| DE | 19843014 | 3/2000 |
|---|---|---|
| EP | 0338428 | 10/1989 |
| EP | 1236682 | 9/2002 |
| WO | 01/34710 | 5/2001 |
| WO | 03/068868 | 8/2003 |

OTHER PUBLICATIONS

English language abstract for DE 19843014 (2000).
Derwent Abstr. 1991-144003 [20] for JP 3079673 (1991).
P. Vapaaoksa, Int. Conf. in Inorg. Coat., (1988), pp. 112-116.

* cited by examiner

*Primary Examiner*—M P Woodward
*Assistant Examiner*—Bethany Barham
(74) *Attorney, Agent, or Firm*—Joseph C. Suhadolnik

(57) ABSTRACT

The present invention relates to platelet-shaped pigments that comprise a layer obtained by calcining $TiO_2/SiO_y$ or $TiO_2/$metal, especially $TiO_2/Al$ ($0.03 \leq y \leq 1.95$, especially $0.03 \leq y \leq 1.8$, more especially $0.70 \leq y \leq 1.8$), and to the use thereof in paints, textiles, ink-jet printing, cosmetics, coatings, plastics, printing inks, in glazes for ceramics and glass, and in security printing. The pigments according to the invention are distinguished by a high gloss and a very uniform thickness, as a result of which very high color purity and color strength are obtained.

20 Claims, 1 Drawing Sheet

TiO₂/SiO/TiO₂ interference structure

REDUCING PIGMENTS

Figure 1:
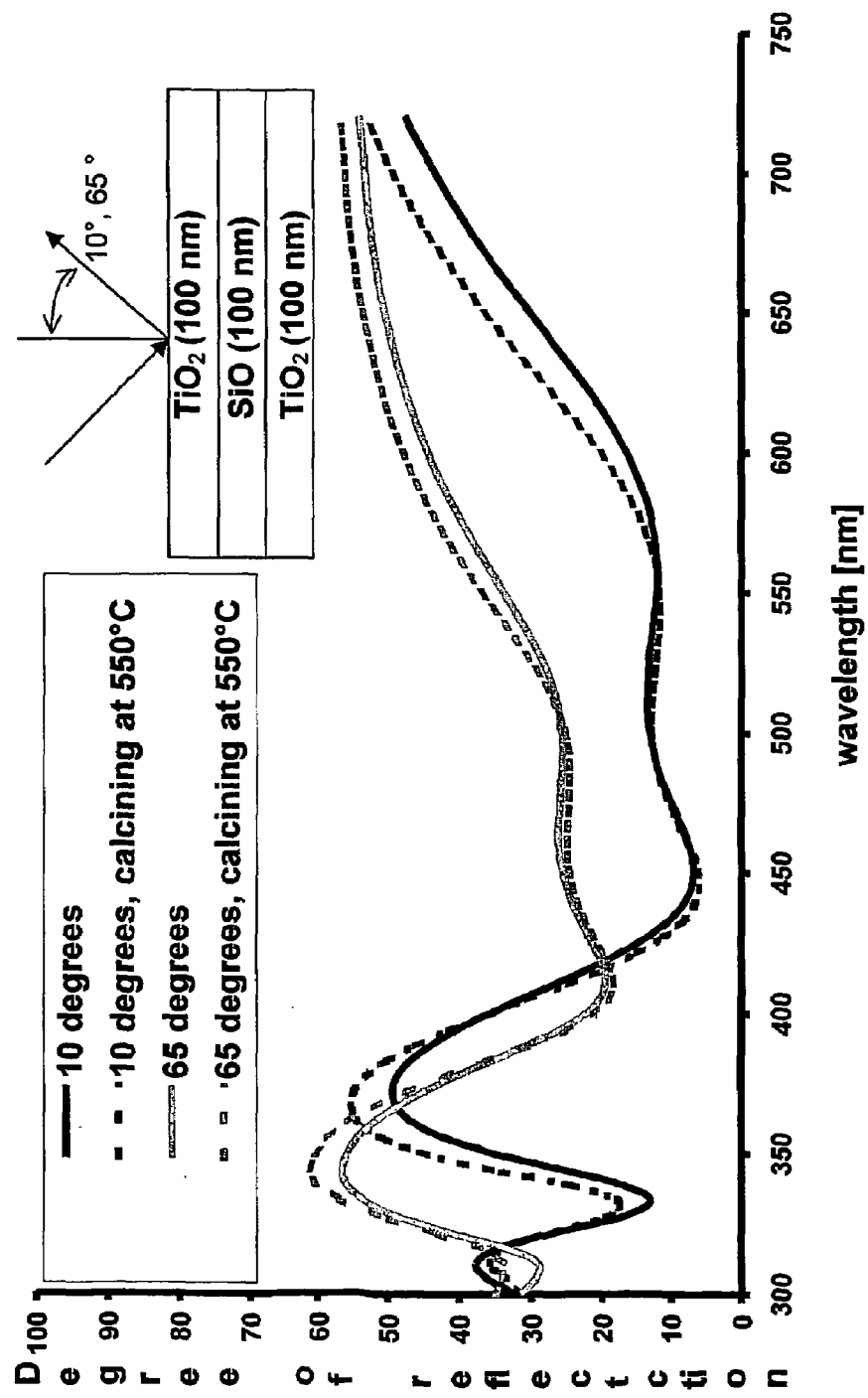

The present invention relates to platelet-shaped pigments that comprise a layer obtained by calcining $TiO_2/SiO_y$, or $TiO_2$/metal, especially Ti, Zr, Cr, or Zn, more especially Al ($0.03 \leq y \leq 1.95$), and to the use thereof in paints, textiles, ink-jet printing, cosmetics, coatings, plastics, printing inks, in glazes for ceramics and glass, and in security printing.

The pigments according to the invention are distinguished by a high gloss and a very uniform thickness, as a result of which very high colour purity and colour strength are obtained.

The known titanium dioxide reducing pigments are based on the use of mica or titanium dioxide platelets as the base substrate. The titanium dioxide is applied to the coated or non-coated base substrates by precipitation and is subsequently reduced to titanium suboxides. Gaseous reducing agents, such as hydrogen or ammonia, or metals, such as, for example, silicon or titanium, are generally used as the reducing agents.

U.S. Pat. No. 4,948,631 discloses a process for the preparation of particularly bluish pearl lustre pigments by reduction of mica pigments coated with titanium dioxide with ammonia at temperatures of from 750 to 850° C.

JP H4-20031 describes a process for the preparation of a coloured mica pigment by mixing a mica pigment coated with titanium dioxide with titanium and reducing the resuming mixture in vacuo at from 500 to 1000° C.

DE-A-19618562 discloses a titanium dioxide reducing pigment consisting of titanium dioxide, titanium suboxides and, where appropriate, a further metal dioxide or titanium oxynitrite. That pigment is obtained by solidifying an aqueous solution of a thermally hydrolysable titanium compound on an endless belt, detaching the resulting layer, coating the resulting titanium dioxide platelets with further titanium dioxide by the wet process, drying and, where appropriate, calcining and treating in a non-oxidising gas atmosphere.

A disadvantage of the known pigments, however, is that they have a too low hiding power and/or do not exhibit colour flop.

A high-gloss, platelet-shaped titanium reducing pigment based on $SiO_2$ platelets is described in DE-A-19843014. The titanium reducing pigment is obtained by mixing $SiO_2$ platelets coated with $TiO_2$ and, where applicable, with at least one further metal oxide, with at least one solid reducing agent in a ratio of from 100:1 to 5:1, and calcining the mixtures in a non-oxidising gas atmosphere at a temperature of more than 600° C.

Surprisingly, it has now been found that pigments based on $SiO_y$ or metal platelets, especially Ti, Zr, Cr, or Zn platelets, more especially Al platelets with high gloss and colour flop, can also be obtained when $TiO_2$-coated $SiO_y$ platelets, wherein $0.03 \leq y \leq 1.95$, or $TiO_2$-coated metal platelets, in particular Al platelets, are first calcined in a non-oxidising gas atmosphere at a temperature of more than 600° C., and particularly the $TiO_2$-coated $SiO_y$ platelets are then treated, where appropriate, at a temperature of more than 200° C., preferably more than 400° C. and especially from 500 to 1000° C., with air or another oxygen-containing gas.

BRIEF DESCRIPTION OF THE DRAWIFIG

FIG. 1 shows the reflection spectra at 10 degrees 65 degrees of Samples 1 and 2.

The present invention accordingly relates to a platelet-shaped pigment comprising a layer obtained by calining $TiO_2/SiO_y$, wherein $0.03 \leq y \leq 1.95$, especially $0.03 \leq y \leq 1.80$, more especially $0.70 \leq y \leq 1.80$, or $TiO_2$/metal, in particular $TiO_2$/Al.

The particles of the platelike pigments generally have a length of from 1 μm to 5 mm, a width of from 1 μm to 2 mm, and a thickness of from 20 nm to 2 μm, and a ratio of length to thickness of at least 2:1, the particles having two substantially parallel faces, the distance between which is the shortest axis of the core.

The flakes of the present invention are not of a uniform shape. Nevertheless, for purposes of brevity, the flakes will be referred to as having a "diameter." The flakes have a high plane-parallelism and a defined thickness in the range of ±30%, especially ±10%, most preferred +/−5% of the average thickness. They have a thickness of from 20 to 2000 nm, especially from 100 to 350 nm. It is presently preferred that the diameter of the flakes be in a preferred range of about 1-60 μm with a more preferred range of about 5-40 μm.

The term "$SiO_y$ with $0.03 \leq y \leq 1.95$" means that the molar ratio of oxygen to silicon at the average value of the silicon oxide layer is from 0.03 to 1.95. The composition of the silicon oxide layer can be determined by ESCA (electron spectroscopy for chemical analysis). $SiO_x$, $SiO_{x1}$, $SiO_{x2}$, $SiO_{y1}$, and $SiO_z$ are defined accordingly.

According to the present invention the term "aluminum" comprises aluminum and alloys of aluminum. Alloys of aluminum are, for example described in G. Wassermann in Ullmanns Enzyklopädie der Industriellen Chemie, 4. Auflage, Verlag Chemie, Weinheim, Band 7, S. 281 to 292. Especially suitable are the corrosion stable aluminum alloys described on page 10 to 12 of WO00/12634, which comprise besides of aluminum silicon, magnesium, manganese, copper, zinc, nickel, vanadium, lead, antimony, tin, cadmium, bismuth, titanium, chromium and/or iron in amounts of less than 20% by weight, preferably less than 10% by weight.

Preference is given to pigments comprising
(a) a substrate layer of $SiO_z$, wherein $0.03 \leq z \leq 2.0$,
(b) an intermediate layer obtained by calcining $TiO_2/SiO_y$, wherein $0.03 \leq y \leq 1.8$, in a non-oxidising atmosphere and
(c) a $TiO_2$ layer, or to pigments comprising
(a) a substrate layer of Al,
(b) an intermediate layer obtained by calcining $TiO_2$/Al in a non-oxidising atmosphere and
(c) a $TiO_2$ layer, special preference being given to pigments based on $SiO_z$ platelets or Al platelets the entire surface of which is coated with $TiO_2$ and which are then calcined in a non-oxidising atmosphere.

Depending on the layer thicknesses of the $TiO_2$ and the $SiO_y$ layer and on the process parameters selected in the calcining process, the entire $TiO_2$ or $SiO_y$ layer may become incorporated in the intermediate layer, producing in that case platelet-shaped pigments having only a substrate layer (a) and an intermediate layer (b) or an intermediate layer (b) and a $TiO_2$ layer (c).

In that embodiment, the invention accordingly relates to platelet-shaped pigments the particles of which generally have a length of from 2 μm to 5 mm, a width of from 2 μm to 2 mm and a thickness of from 20 nm to 1.5 μm, and a length to thickness ratio of at least 2:1, the particles having a core of $SiO_z$ or Al with two substantially parallel faces, the distance between which faces is the shortest axis of the core, and having a $TiO_2$ layer applied to the parallel faces, and preferably to the entire surface, of the core, there being arranged between the $SiO_z$ or Al substrate and the $TiO_2$ layer an intermediate layer obtained by calcining $TiO_2/SiO_z$, wherein $0.03 \leq y \leq 1.8$. The pigments may, where appropriate, have further layers on top of the $TiO_2$ layer.

The thickness of the $SiO_z$ layer is generally from 20 to 1000 nm, preferably from 50 to 500 nm, and that of the $TiO_2$ layer is generally from 1 to 200 nm, especially 10 to 100 nm, more especially from 20 to 50 nm.

The invention also relates to the use of the pigments according to the invention in paints, textiles (EP02405889.3), ink-jet printing (EP02405888.5), cosmetics (WO/03076520), printing inks, plastics, coatings (WO03/068868), especially in automotive finishes, in glazes for ceramics and glass, and in security printing.

The pigments based on $SiO_z$ or Al platelets are obtained by calcining $TiO_2$-coated $SiO_y$ or Al platelets, wherein $0.03 \leq y \leq 1.95$, especially $0.03 \leq y \leq 1.80$, more especially $0.70 \leq y \leq 1.80$, in a non-oxidising gas atmosphere at a temperature of more than 600° C. (below 600° C. with Al), preferably in the range from 700 to 1100° C., for more than 10 minutes, preferably for from 15 to 120 minutes. Particularly the pigments based on the $SiO_y$ platelets can then be treated, at a temperature of more than 200° C., preferably more than 400° C. and especially from 500 to 1000° C., with air or another oxygen-containing gas.

The $TiO_2$-coated $SiO_y$ or metal platelets, in particular Al platelets, can basically be obtained by means of a process comprising the following steps (WO03/068868):

a) vapour-deposition of a $TiO_2$ layer onto a carrier,
b) vapour-deposition of an $SiO_y$ layer or a metal layer, in particular an aluminium layer, onto the $TiO_2$ layer obtained in step a), and
c) vapour-deposition of a $TiO_2$ layer onto the $SiO_y$ layer or metal layer obtained in step b).

Preferably, a separating agent is vapour-deposited onto the carrier before step a), to produce a separating agent layer which facilitates separation of the flakes from the carrier.

Preferably, however, first $SiO_y$ or Al flakes are produced which are then coated with $TiO_2$ by wet-chemical application.

The invention is illustrated below in more detail with reference to Al as metal layer without limiting the scope thereof.

There may be used as Al substrate Al platelets punched from Al foil or Al pigments produced by known atomising and grinding techniques. Preferably, Al flakes produced by means of physical vapour deposition are used (see, for example, U.S. Pat. No. 4,321,087, WO00/24946). Such a process comprises the following steps:

a) vapour-deposition of a separating agent onto a carrier to produce a separating agent layer,
b) vapour-deposition of an Al layer onto the separating agent layer,
c) dissolution of the separating agent layer in a solvent and
d) separation of the Al flakes from the solvent The aluminium pigments may then be coated with titanium dioxide by the chemical vapour deposition (CVD) process, for example in accordance with EP-A-38428. In that process, $TiCl_4$ vapour is allowed to react in low concentration with $H_2O$ vapour in a fluidised bed in the presence of warmed moving Al particles.

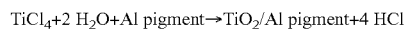

$TiCl_4 + 2\,H_2O + Al\ pigment \rightarrow TiO_2/Al\ pigment + 4\,HCl$

The titanium-dioxide-coated Al flakes are then calcined in a non-oxidising gas atmosphere at a temperature below 600° C., for more than 10 minutes, preferably for from 15 to 120 minutes. The reduction reaction takes place in a non-oxidising gas atmosphere, such as, for example, $N_2$, Ar, He, $CO_2$, $H_2$ or $NH_3$, preference being given to $N_2$ or Ar. In the case of $N_2$ or $NH_3$, TiN or TiON may be produced in addition to $TiO_{2-x}$.

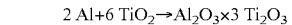

$2\,Al + 6\,TiO_2 \rightarrow Al_2O_3 \times 3\,Ti_2O_3$

$2\,Al + 3\,TiO_2 \rightarrow Al_2O_3 \times 3\,TiO$

The titanium-dioxide-coated reducing pigments may then be coated with further inorganic coatings, such as, for example, a $Fe_2O_3$, chromium oxide, or CrOOH, $SiO_2$, $Al_2O_3$ or $ZrO_2$ coating.

It is especially advantageous to use $SiO_y$ flakes as starting material. Platelet-shaped $SiO_y$ substrates wherein $0.95 \leq y \leq 1.95$, preferably wherein $1.0 \leq y \leq 1.80$, can be obtained by means of a process comprising the following steps (see WO03/068868):

a) vapour-deposition of a separating agent onto a carrier to produce a separating agent layer,
b) vapour-deposition of an $SiO_y$ layer onto the separating agent layer,
c) dissolution of the separating agent layer in a solvent and
d) separation of the $SiO_y$ flakes from the solvent.

The process mentioned above makes available $SiO_z$ substrates that, compared with natural mica platelets and with platelets produced in wet procedures, have a high degree of plane parallelism and a defined thickness in the region of ±30%, preferably ±10%, most preferred +/−5%, of the average thickness.

$SiO_y$ substrates or layers, wherein $0.70 \leq y \leq 0.99$, are formed preferably by evaporating silicon monoxide containing silicon in an amount up to 20% by weight at temperatures of more than 1300° C. If, under industrial vacuums of a few $10^{-2}$ Pa, Si is vaporised (instead of $Si/SiO_2$ or SiO/Si) silicon oxides can be obtained which have an oxygen content of less than 0.95, that is to say $SiO_x$, wherein $0.03 \leq x \leq 0.95$, especially $0.05 \leq x \leq 0.50$, very especially $0.10 \leq x \leq 0.30$ (WO03/076520).

The $SiO_y$ layer wherein $0.95 \leq y \leq 1.95$, preferably $1.0 \leq y \leq 1.80$, in step b) is preferably vapour-deposited from a vaporiser containing a charge comprising a mixture of Si and $SiO_2$, $SiO_y$, or a mixture thereof. The $SiO_y$ layer is obtained by heating a preferably stoichiometric mixture of fine silicon and quartz ($SiO_2$) powder in a vaporiser described, for example, in DE-C-4342574 and in U.S. Pat. No. 6,202,591 to more than 1300° C. under a high vacuum. The reaction product is silicon monoxide gas, which under vacuum is directed directly onto the passing carrier, where it condenses as SiO. Non-stoichiometric mixtures may also be used. The vaporiser contains a charge comprising a mixture of Si and $SiO_2$, $SiO_y$, or a mixture thereof, the particle size of the substances that react with one another (Si and $SiO_2$) being advantageously less than 0.3 mm. The weight ratio of Si to $SiO_2$ is advantageously in the range from 0.15:1 to 0.75:1 (parts by weight); preferably, a stoichiometric mixture is present $SiO_y$ present in the vaporiser vaporises directly. Si and $SiO_2$ react at a temperature of more than 1300° C. to form silicon monoxide vapour. The separating agent condensed onto the carrier may be a lacquer, a polymer, such as, for example, those described in U.S. Pat. No. 6,398,999 (thermoplastic polymers), especially acrylic or styrene polymers or mixtures thereof, an organic substance soluble in organic solvents or water and vaporisable in vacuo, such as anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaph-thalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol or a mixture of at least two of those substances. The separating agent is preferably an inorganic salt soluble in water and vaporisable in vacuo (see, for example, DE-A-19844357), such as sodium chloride, potassium chloride, lithium chloride, sodium fluoride, potassium fluoride, lithium fluoride, calcium fluoride, sodium aluminium fluoride and disodium tetraborate.

Step c) is usually carried out at a pressure that is higher than the pressure in steps a) and b) and lower than atmospheric pressure.

The movable carrier preferably comprises one or more continuous metal belts, with or without a polymer coating, or one or more polyimide or polyethylene terephthalate belts. The movable carrier may furthermore comprise one or more discs, cylinders or other rotationally symmetrical bodies, which rotate about an axis.

It is possible for a plurality of separating agent layers and silicon suboxide layers to be vapour-deposited onto the movable carrier in vacuo alternately in succession before their removal by dissolution of the condensed separating agent layers. The plane-parallel structures consisting of $SiO_y$ are separated from the solvent of the separating agent preferably by washing-out and subsequent filtration, sedimentation, centrifugation, decanting or evaporation. Furthermore, the plane-parallel structures (platelets, or flakes) consisting of silicon suboxide ($SiO_y$) may, after washing-out of the dissolved separating agent contained in the solvent, be frozen together with the solvent and subsequently subjected to a process of freeze-drying, during which the solvent is separated off as a result of sublimation below the triple point and the dry silicon suboxide remains behind in the form of individual plane-parallel structures.

The silicon suboxide condensed on the movable carrier corresponds to the formula $SiO_y$, wherein $0.95 \leq y \leq 1.8$, preferably wherein $1.0 \leq y \leq 1.8$, y values of less than 1 being obtained by means of an excess of silicon in the vaporiser material. Except under an ultra-high vacuum, in industrial vacuums of a few $10^{-2}$ Pa vaporised SiO always condenses as $SiO_y$, wherein $1 \leq y \leq 1.8$, especially wherein $1.1 \leq y \leq 1.5$, because high-vacuum apparatuses always contain, as a result of gas emission from surfaces, traces of water vapour which react with the readily reactive SiO at vaporisation temperature.

In detail, a salt, for example NaCl, followed by a layer of silicon suboxide ($SiO_y$) are successively vapour-deposited onto a carrier, which may be a continuous metal belt, passing by way of the vaporisers under a vacuum of <0.5 Pa. The vapour-deposited thicknesses of salt are approximately from 20 to 100 nm, preferably from 30 to 60 nm, and those of SiO are, depending on the intended use of the product, from 20 to 1000 nm, preferably from 50 to 500 nm. On its further course, the belt-form carrier, which is closed to form a loop, runs through dynamic vacuum lock chambers of known construction (cf. U.S. Pat. No. 6,270,840) into a region of from 1 to $5 \times 10^4$ Pa pressure, preferably from 600 to $10^9$ Pa pressure, and especially from $10^3$ to $5 \times 10^3$ Pa pressure, where it is immersed in a separating bath. The temperature of the solvent should be so selected that its vapour pressure is in the indicated pressure range. With mechanical assistance, the separating agent layer rapidly dissolves and the product layer breaks up into flakes, which are then in the form of a suspension in the solvent. On its further course, the belt is dried and freed from any contaminants still adhering to it. It runs through a second group of dynamic vacuum lock chambers back into the vaporisation chamber, where the process of coating with separating agent and product layer of $SiO_y$ is repeated.

The suspension then obtained in both cases, comprising product structures and solvent with separating agent dissolved therein, is then separated in a further operation in accordance with a known technique. For that purpose, the product structures are first concentrated in the liquid and rinsed several times with fresh solvent in order to wash out the dissolved separating agent. The product, in the form of a solid that is still wet, is then separated off by means of filtration, sedimentation, centrifugation, decanting or evaporation, and is dried.

It is possible to arrange a plurality of separating agent and product vaporisers one after another in the running direction of the belt in the vaporisation zone. By that means there is obtained, with little additional outlay in terms of apparatus, a layer sequence of S+P+S+P, wherein S is the separating agent layer and P is the product layer.

Separating off the plane-parallel structures after washing-out at atmospheric pressure can be carried out under gentle conditions by freezing the suspension, which has been concentrated to a solids content of approximately 50%, and subjecting it in known manner to freeze-drying at approximately −10° C. and 50 Pa pressure. The dry substance remains behind as product, which can be subjected to the steps of further processing by means of coating or chemical conversion.

Instead of using a continuous belt, it is possible to produce the product by carrying out the steps of vapour-deposition of separating agent and SiO, of separation, and of drying the carrier, in an apparatus having a rotary body, in accordance with WO01/25500. The rotary body may be one or more discs, a cylinder or any other rotationally symmetrical body.

The substrate may also be a multi-layered substrate, such as, for example, a multi-layered platelet-shaped substrate layer having a core of $SiO_{x1}$ that has a $SiO_{x2}$ layer, or a $SiO_{y1}$ layer on the lower and upper surfaces, but not on the side faces, a multi-layered platelet-shaped substrate layer having a core of $SiO_{x2}$ that has a $SiO_{x1}$ layer, or $SiO_{y1}$ layer on the lower and upper surfaces, but not on the side faces, a multi-layered platelet-shaped substrate layer having a core of $SiO_{y1}$ that has a $SiO_{x1}$ layer, or $SiO_{x2}$ layer on the lower and upper surfaces, but not on the side faces, or a multi-layered platelet-shaped substrate layer having a core of a metal, especially Al that has a $SiO_{x1}$ layer, a $SiO_{x2}$ layer, or a $SiO_{y1}$ layer on the lower and upper surfaces, but not on the side faces, wherein $0.03 \leq x1 \leq 0.70$, especially $0.05 \leq x1 \leq 0.50$, very especially $0.10 \leq x1 \leq 0.30$, $0.70 \leq x2 \leq 0.99$, and $1.00 \leq y1 \leq 1.95$, especially $1.0 \leq y1 \leq 1.8$, very especially $1.1 \leq y1 \leq 1.8$ (PCT/EP03/50229).

The substrate may furthermore be a substrate having a layer structure of $SiO_y$/metallically reflecting material, preferably a metal having a melting point greater than 1000° C., such as, for example, titanium/$SiO_y$, which is obtained by vapour-depositing $SiO_y$, metallically reflecting material and $SiO_y$ onto the separating agent in succession.

The pigments formed from the multi-layered substrates accordingly comprise (a) a multi-layered platelet-shaped substrate layer, (b) an intermediate layer obtained by calcining $TiO_2/SiO_{x1}$, $TiO_2/SiO_{x2}$ or $TiO_2/SiO_{y1}$ in a non-oxidising atmosphere and (c) a TiO$_2$ layer, wherein $0.03 \leq x1 \leq 0.70$, especially $0.05 \leq x1 \leq 0.50$, very especially $0.10 \leq x1 \leq 0.30$, $0.70 \leq x2 \leq 0.99$, and $1.00 \leq y1 \leq 1.95$, especially $1.0 \leq y1 \leq 1.8$, very especially $1.1 \leq y1 \leq 1.8$.

Coating of the SiO$_y$ platelets can be carried out by wet-chemical application, as described, for example, in WO 93/08237, by means of sol-gel processes or by means of CVD processes, as described, for example, in DE-A-19614637. Coating of the SiO$_y$ platelets is preferably carried out by wet-chemical application, it being possible to use the procedures developed for pearlescent pigments, which are described, for example, in DE-A-1467468, DE-A-1959988, DE-A-2009566, DE-A-2214545, DE-A-2215191, DE-A-2244298, DE-A-2313331, DE-A-2522572, DE-A-3137808, DE-A-3137809, DE-A-3151343, DE-A-3151354, DE-A-3151355, DE-A-3211602 and DE-A-3235017, DE-A-1959988, WO93/08237, WO98/53001 and WO03/6558.

For coating, the SiO$_y$ particles are suspended in water and one or more hydrolysable titanium salts are added thereto at a pH value suitable for hydrolysis which is so selected that the titanium oxides or titanium oxide hydrates are precipitated directly onto the particles without secondary precipitations occurring. The pH value is usually kept constant by simultaneously metering in a base. The pigments are then separated off, washed and dried and, where appropriate, calcined. If desired, the pigments may be separated off, dried and, where appropriate, calcined after individual coatings have been applied, in order then to be resuspended for the precipitation of further layers.

The titanium oxide layers are obtainable, for example, analogously to a method described in DE-A-19501307, by producing the titanium oxide layer by controlled hydrolysis of one or more metallic acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxypropylamine. The organic solvent is a water-miscible organic solvent, such as a C$_{1-4}$alcohol, especially isopropanol.

Suitable titanic acid esters are selected from the group comprising alkyl and aryl alcoholates, carboxylates, and carboxyl-radical- or alkyl-radical- or aryl-radical-substituted alkyl alcoholates or carboxylates of titanium. Tetraisopropyl titanate is preferred. In addition, acetylacetonates and acetoacetylacetonates of titanium may be used. A preferred example of that type of metallic acid ester is titanium acetylacetonate.

According to a preferred embodiment of the present invention, the process described in U.S. Pat. No. 3,553,001 is used for application of the titanium dioxide layers. An aqueous titanium salt solution is slowly added to a suspension of the material being coated, which suspension has been heated to approximately 50-100° C., especially 70-80° C., and a substantially constant pH value of approximately from 0.5 to 5, especially approximately from 1.2 to 2.5, is maintained by simultaneously metering in a base, such as, for example, aqueous ammonia solution or aqueous alkali metal hydroxide solution. As soon as the desired layer thickness of precipitated TiO$_2$ has been achieved, the addition of titanium salt solution and base is stopped.

That process, also referred to as a titration process, is distinguished by the fact that an excess of titanium salt is avoided. That is achieved by feeding in for hydrolysis, per unit of time, only that amount which is necessary for even coating with the hydrated TiO$_2$ and which can be taken up per unit of time by the available surface of the particles being coated.

The particles based on SiO$_y$ platelets wherein $0.03 \leq y \leq 1.95$, especially $0.03 \leq x1 \leq 0.70$, $0.70 \leq x2 \leq 0.99$ and $1.0 \leq y1 \leq 1.95$, especially $1.10 \leq y1 \leq 1.80$, and comprising (a) a substrate layer of SiO$_y$ and (b) a TiO$_2$ layer, which are obtained after customary working-up, are novel and the present invention relates to them also. If the TiO$_2$ layer is deposited by a wet chemical process onto the SiO$_y$ platelets, the TiO$_2$ is present on the whole surface of the SiO$_y$ platelets, including the lower and upper surfaces as well as the side faces of the SiO$_y$ platelets.

The TiO$_2$-coated SiO$_y$ platelets are subsequently calcined in a non-oxidising gas atmosphere at a temperature of more than 600° C., preferably in the range from 700 to 1100° C., for more than 10 minutes, preferably for from 15 to 120 minutes. The reduction reaction takes place in a non-oxidising gas atmosphere, such as, for example, N$_2$, Ar and/or He, or under a vacuum of less than 13 Pa ($10^{-1}$ torr), preference being given to N$_2$ or Ar. In the case of N$_2$ or NH$_3$, TiN or TiON may be produced in addition to TiO$_{2-x}$.

The TiO$_2$-coated SiO$_y$ platelets can optionally be subjected to oxidative heat treatment. For example, air or some other oxygen-containing gas is passed through the platelets, which are in the form of loose material or in a fluidised bed, at a temperature of more than 200° C., preferably more than 400° C. and especially from 500 to 1000° C. The product can then be brought to the desired particle size by grinding, treatment with ultrasound, air-classification or sieving, and delivered for further use.

The pigments based on SiO$_y$ platelets and comprising (a) a substrate layer of SiO$_z$, wherein $0.03 \leq z \leq 2.0$, especially $0.10 \leq y \leq 2.0$, more especially $0.70 \leq y \leq 2.0$, (b) an intermediate layer obtained by calcining TiO$_2$/SiO$_y$, wherein $0.03 \leq y \leq 1.95$, especially $0.03 \leq y \leq 1.80$, more especially $0.70 \leq y \leq 1.80$, and (c) a TiO$_2$ layer, which are obtained in that case, are also novel and the present invention relates to them also.

In principle, the anatase form of TiO$_2$ forms on the surface of the starting pigment. By adding small amounts of SnO$_2$, however, it is possible to force the ruffle structure to be formed by calcination at from 800 to 900° C. (see, for example, WO 93/08237 and U.S. Pat. No. 4,086,100).

In a further preferred embodiment, the substrate comprises in this order:
(a1) a SiO$_{x1}$ layer, or a SiO$_{x2}$ layer, especially a SiO$_{y1}$ layer,
(b1) a reflective layer, especially a metal layer, and
(c1) a SiO$_{x1}$ layer, or a SiO$_{x2}$ layer, especially a SiO$_{y1}$ layer, wherein $0.03 \leq x1 \leq 0.70$, especially $0.05 \leq x1 \leq 0.50$, very especially $0.10 \leq x1 \leq 0.30$, $0.70 \leq x2 \leq 0.99$, and $1.00 \leq y1 \leq 1.95$, especially $1.0 \leq y1 \leq 1.8$, very especially $1.1 \leq y1 \leq 1.8$.

The substrates comprising layers (a1), (b1) and (c1) are prepared by a process comprising the steps:
a) vapour-deposition of a separating agent onto a movable carrier to produce a separating agent layer,
b1) vapour-deposition of a SiO$_{x1}$ layer, a SiO$_{x2}$ layer, or a SiO$_{y1}$ layer onto the separating agent layer,
b2) vapour-deposition of a reflective material, especially titanium or aluminium, onto the layer obtained in step (b1),
b3) vapour-deposition of a SiO$_{x1}$ layer, a SiO$_{x2}$ layer, or a SiO$_{y1}$ layer onto the metal layer,
c) dissolution of the separating agent layer in a solvent, and
d) separation of the silicon oxide/reflective material/silicon oxide particles from the solvent If step (b3) is omitted, unsymmetrical pigments comprising layers (a1) and (b1) are obtained. The reflective layer consists preferably of a metallic reflecting material, especially Ag, Al, Au, Cu, Cr, Ge, Mo, Ni, Si, Ti, the alloys thereof, graphite, $Fe_2O_3$ or $MoS_2$, particularly preferably Al or $MoS_2$. If Al forms the reflective layer and the reflective layer should be retained, temperatures above 600° C. should be avoided to prevent reaction of the Al with silicon and/or silicon oxide contained in the neighbouring layers. If Al forms the reflective layer and the flakes are heated to temperatures above 600° C., the Al reacts with silicon and/or silicon oxide contained in the neighbouring layers and the reflective layer is converted into a transparent aluminum silicate layer.

If Al is used as metal of layer (b1), the thickness of layer (b1) is generally 20 to 100 nm, especially 40 to 60 nm. The Al is evaporated at temperatures of more than 1000° C.

The thickness of layers (a1) and (c1) is generally 2 to 500 nm, especially 50 to 300 nm.

In a further preferred embodiment, the substrate comprises in this order
(a2) a $SiO_{0.70-0.99}$ layer,
(b2) a $SiO_{1.00-1.8}$ layer, and
(c2) a $SiO_{0.70-0.99}$ layer.

The substrates comprising layers (a2), (b2) and (c2) are prepared by a process comprising the steps:
a) vapour-deposition of a separating agent onto a movable carrier to produce a separating agent layer,
b1) vapour-deposition of a $SiO_y$ layer onto the separating agent layer, wherein $0.70 \leq y \leq 0.99$,
b2) vapour-deposition of a $SiO_y$ layer, wherein $1.0 \leq y \leq 1.8$ onto the layer obtained in step (b1),
b3) vapour-deposition of a $SiO_y$ layer, wherein $0.70 \leq y \leq 0.99$, onto the layer obtained in step (b2),
c) dissolution of the separating agent layer in a solvent, and
d) separation of the $SiO_{0.70-0.99}/SiO_{1.0-1.8}/SiO_{0.70-0.99}$ particles from the solvent.

If step (b3) is omitted, unsymmetrical pigments comprising layers (a2) and (b2) are obtained.

The $SiO_{1.00-1.8}$ layer in step b) is formed preferably from silicon monoxide vapour produced in the vaporiser by reaction of a mixture of Si and $SiO_2$ at temperatures of more than 1300° C.

The $SiO_{0.70-0.99}$ layer in step b) is formed preferably by evaporating silicon monoxide containing silicon in an amount up to 20% by weight at temperatures of more than 1300° C.

In a further preferred embodiment, the substrate comprises in this order:
(a3) a $SiO_{1.00-1.8}$ layer,
(b3) a $SiO_{0.70-0.99}$ layer, and
(c3) a $SiO_{1.00-1.8}$ layer.

The substrates comprising layers (a3), (b3) and (c3) are prepared by a process comprising the steps:
a) vapour-deposition of a separating agent onto a movable carrier to produce a separating agent layer,
b1) vapour-deposition of a $SiO_y$ layer onto the separating agent layer, wherein $1.0 \leq y \leq 1.8$,
b2) vapour-deposition of a $SiO_y$ layer, wherein $0.70 \leq y \leq 0.99$, onto the layer obtained in step (b1),
b3) vapour-deposition of a $SiO_y$ layer, wherein $1.0 \leq y \leq 1.8$, layer onto the layer obtained in step (b2).
c) dissolution of the separating agent layer in a solvent,
d) separation of the $SiO_{1.0-1.8}/SiO_{0.70-0.99}/SiO_{1.0-1.8}$ particles from the solvent.

The $SiO_{1.00-1.8}$ layer in step b1) and b3) is formed preferably from silicon monoxide vapour produced in the vaporiser by reaction of a mixture of Si and $SiO_2$ at temperatures of more than 1300° C.

The $SiO_{0.70-0.99}$ layer in step b2) is formed preferably by evaporating silicon monoxide containing silicon in an amount up to 20% by weight at temperatures of more than 1300° C.

If, under industrial vacuums of a few $10^{-2}$ Pa, Si is vaporised (instead of $Si/SiO_2$ or $SiO/Si$) silicon oxides can be obtained which have an oxygen content of less than 0.95, that is to say $SiO_x$, wherein $0.03 \leq x \leq 0.95$ (WO03/076520).

If step (b3) is omitted, unsymmetrical pigments comprising layers (a3) and (b3) are obtained.

The thickness of layer (b3) is generally 50 to 400 nm, especially 100 to 300 nm.

The thickness of layers (a3) and (c3) is generally 50 to 200 nm, especially 50 to 100 nm.

The colour effect of the pigments can generally be adjusted by way of
the thickness of the $TiO_2$ layer,
the thickness of the intermediate layer and
the composition of the intermediate layer.

It is assumed that calcining $TiO_2/SiO_y$ in a non-oxidising atmosphere produces an intermediate layer that causes a change in the refractive index. However, the possibility that the intermediate layer is not a continuous layer and that, rather, only individual regions at the interface of $TiO_2$ and $SiO_y$ undergo a conversion that causes a change in the refractive index cannot be ruled out it is further assumed that the change in the refractive index is due to the reduction of $TiO_2$ by $SiO_y$. The principle according to the invention is based, therefore, on producing, by reduction of $TiO_2$ with $SiO_y$ (or Al), an intermediate layer that causes a change in the refractive index.

$$TiO_2 + SiO_y \rightarrow SiO_{y+b} + TiO_{2-b}$$

At present, it can not be excluded, that by heating $TiO_2/SiO_y$ particles in an oxygen-free atmosphere, i.e. an argon or helium atmosphere, or in a vacuum of less than 13 Pa ($10^{-1}$ Torr), at a temperature above 400° C., especially 400 to 1100° C., besides the reduction of $TiO_2$ by $SiO_y$, $SiO_y$ disproportionates in $SiO_2$ and Si (PCT/EP03/50229).

$$SiO_y \rightarrow (y/y+a) SiO_{y+a} + (1-(y/y+a)) Si$$

In this disproportion $SiO_{y+a}$ flakes are formed, containing $(1-(y/y+a))$ Si, wherein $0.03 \leq y \leq 1.95$, especially $0.70 \leq y \leq 0.99$ or $1 \leq y \leq 1.8$, $0.05 \leq a \leq 1.97$, especially $0.05 \leq a \leq 1.30$, and the sum y and a is equal or less than 2. $SiO_{y+a}$ is an oxygen enriched silicon suboxide.

Various coating processes can be utilized in forming additional coating layers. Suitable methods for forming the coating layer include vacuum vapor deposition, sol-gel hydrolysis, CVD in a fluidized bed (U.S. Pat. No. 5,364,467 and U.S. Pat. No. 5,763,086), and electrochemical deposition. Another depositing method is the plasma enhanced chemical vapor deposition (PECVD) where the chemical species are activated by a plasma. Such a method is disclosed in detail in WO02/31058.

In principle, the plane parallel pigments can comprise in addition materials having a "low" index of refraction, which is defined herein as an index of refraction of about 1.65 or less, and/or can have a "high" index of refraction, which is defined herein as an index of refraction of greater than about 1.65, and/or semi-transparent metal layers. Various (dielectric) materials that can be utilized include inorganic materials such as metal oxides, metal fluorides, metal sulfides, metal nitrides, metal carbides, combinations thereof, and the like, as well as organic dielectric materials. These materials are readily available and easily applied by physical or chemical vapor deposition processes.

Non limiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895.

Suitable metals for the semi-transparent metal layer are, for example, Cr, Ti, Mo, W, Al, Cu, Ag, Au, or Ni.

Examples of the dielectric material having a "high" refractive index, that is to say a refractive index greater than about 1.65, preferably greater than about 2.0, most preferred greater than about 2.2, are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide (y203), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$) or combinations thereof. The dielectric material is preferably a metal oxide, it being possible for the metal oxide to be a single oxide or a mixture of oxides, with or without absorbing properties, for example $TiO_2$, $ZrO_2$, $Fe_2O_3$, $Fe_3O_4$, $Cr_2O_3$ or ZnO, with $TiO_2$ being especially preferred.

The metal oxide layers can be applied by CVD (chemical vapour deposition) or by wet chemical coating. The metal oxide layers can be obtained by decomposition of metal carbonyls in the presence of water vapour (relatively low molecular weight metal oxides such as magnetite) or in the presence of oxygen and, where appropriate, water vapour (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A-45851), by means of hydrolytic gaseous phase decomposition of metal alcoholates (e.g. titanium and zirconium tetra-n- and -iso-propanolate; DE-A-4140900) or of metal halides (e.g. titanium tetrachloride; EP-A-338428), by means of oxidative decomposition of organyl tin compounds (especially alkyl tin compounds such as tetrabutyltin and tetramethyltin; DE-A4403678) or by means of the gaseous phase hydrolysis of organyl silicon compounds (especially di-tert-butoxyacetoxysilane) described in EP-A-668329, it being possible for the coating operation to be carried out in a fluidised-bed reactor (EP-A-045851 and EP-A-106235). $Al_2O_3$ layers (B) can advantageously be obtained by controlled oxidation during the cooling of aluminium-coated pigments, which is otherwise carried out under inert gas (DE-A-19516181).

It is possible to obtain pigments that are more intense in colour and more transparent by applying, on top of the $TiO_2$ layer, a metal oxide of low refractive index, such as $SiO_2$, $Al_2O_3$, AlOOH, $B_2O_3$ or a mixture thereof, preferably $SiO_2$, and applying a further $TiO_2$ layer on top of the latter layer (EP-A-892832, EP-A-753545, WO93/08237, WO98/53011, WO98/12266, WO98/38254, WO99/20695, WO00/42111 and EP-A-1 213 330).

Where appropriate, an $SiO_2$ (protective) layer can be applied on top of the titanium dioxide layer, for which the following method may be used: A soda water glass solution is metered into a suspension of the material being coated, which suspension has been heated to approximately 50-100° C., especially 70-80° C. The pH is maintained at from 4 to 10, preferably from 6.5 to 8.5, by simultaneously adding 10% hydrochloric acid. After addition of the water glass solution, stirring is carried out for a further 30 minutes.

It is furthermore possible to subject the finished pigment to subsequent coating or subsequent treatment which further increases the light, weather and chemical stability or which facilitates handling of the pigment, especially its incorporation into various media. For example, the procedures described in DE-A-2215191, DE-A-3151354, DE-A-3235017, DE-A-3334598, DE-A-4030727, EP-A649886, WO97/29059, WO99/57204, and U.S. Pat. No. 5,759,255 are suitable as subsequent treatment or subsequent coating.

It is also possible to reduce the $TiO_2$ present on the surface of the pigments by means of the processes described in DE-A-19502231, WO97/39065, WO00/17277 and especially DE-A-19843014, thereby forming titanium suboxides, metal oxides, non-metal oxides, titanium nitrides and/or titanium oxynitrides.

The reducing agents employed are gaseous reducing agents, such as, for example, hydrogen, or solid reducing agents in the form of metal powders, alloys of metals, metal borides, metal carbides or metal silicides. The use of powders of metals/non-metals, such as boron, aluminium, silicon, zinc or iron and especially silicon or combinations thereof is preferred.

Customary reducing agents such as the alkali metals may be used in the liquid or gaseous phase. Other reducing agents to be mentioned are hydrides, such as LiH or $CaH_2$. Combinations of those reducing agents with one another are also suitable.

The titanium-dioxide-coated platelets are intensively mixed with the above-described solid reducing agents in a ratio of from 100:1 to 5:1 and treated in a non-oxidising atmosphere at temperatures of more than 600° C., preferably in the range from 700 to 1100° C., for more than 10 minutes, preferably for from 15 to 60 minutes.

The reduction reaction is accelerated in the presence of a halide, preferably a chloride. Preference is especially given to LiCl, NaCl, KCl, $MgCl_2$, $CaCl_2$, $CuCl_2$, $CrCl_3$, $MnCl_2$, $FeCl_2$, $FeCl_3$, $CoCl_2$, $NiCl_2$ or $CeCl_3$. The reaction temperature can be reduced by from 150 to 300° C. in the presence of a chloride, such as, for example, $CaCl_2$. The chloride should preferably be anhydrous. The amounts of halide may be from 0.1 to 40% by weight, preferably from 0.5 to 10% by weight, based on the $SiO_2$ platelet coated with $TiO_2$. In addition, the pigment according to the invention can also be coated with poorly soluble, firmly adhering, inorganic or organic colourants. Preference is given to the use of colour lakes and, especially, aluminium colour lakes. For that purpose an aluminium hydroxide layer is precipitated, which is, in a second step, laked by using a colour lake (DE-A-2429762 and DE-A-2928287).

Furthermore, the pigment according to the invention may also have an additional coating with complex salt pigments, especially cyanoferrate complexes (EP-A-141173 and DE-A-2313332).

The pigment according to the invention may also be coated with organic dyes and especially with phthalocyanine or metal phthalocyanine and/or indanthrene dyes in accordance with DE-A-4009567.

Coloured pigments can be produced by mixing $TiO_2$-coated $SiO_z$ platelets with at least one solid reducing agent, preferably an alkaline earth metal, B, Al, Si, Zn, Fe, LiH, $CaH_2$, $Al_4C_3$, $Mg_2Si$, $MgSi_2$, $Ca_2Si$ or $CaSi_2$, and calcining the mixture in a non-oxidising gas atmosphere for longer than 10 minutes at a temperature above 600° C. The reduction reaction takes place in a non-oxidising gas atmosphere, such as, for example, $N_2$, Ar, He, $CO_2$, $H_2$ or $NH_3$, preference being given to $N_2$ or Ar. Preference is also given to hydrogen/nitrogen mixtures having a hydrogen content of preferably 3% by volume. In the case of $N_2$ or $NH_3$, TiN or TiON may be produced in addition to $TiO_{2-x}$.

The pigments according to the invention are distinguished by a high gloss and a very uniform thickness, as a result of which very high colour purity and colour strength are obtained. The pigments according to the invention can be used for all customary purposes, for example for colouring textiles, polymers in the mass, coatings (including effect finishes, including those for the automotive sector), glazes for ceramics and glasses, and printing inks (including those for security printing), and also, for example, for applications in cosmetics and in ink-jet printing. Such applications are known from reference works, for example "Industrielle Organische Pigmente" (W. Herbst and K. Hunger, VCH Veriagsgesellschaft mbH Weinhelm/New York, 2nd, completely revised edition, 1995).

The pigments according to the invention are effect pigments (metal effect pigments and interference pigments), that is to say, pigments that, besides imparting colour to an application medium, impart additional properties such as, for example, angle dependence of the colour (flop), lustre (not surface gloss) or texture. On metal effect pigments, substantially directed reflection occurs at directionally oriented pigment particles. In the case of interference pigments, the colour-imparting effect is due to the phenomenon of interference of light in thin, highly refractive layers. The pigments according to the invention may be goniochromatic and brilliant and produce highly saturated (bright) colours. They are accordingly very especially suitable for combination with conventional, transparent pigments, for example organic pigments such as, for example, diketopyrrolopyrroles, quinacridones, dioxazines, perylenes, isoindolinones etc. The transparent pigment may have a similar colour to the effect pigment. Especially interesting combination effects are obtained, however, in analogy to, for example, EP-A388932 or EP-A402943, when the colour of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or modified natural substances, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA. From the series of the polyaddition resins and polycondensation resins there may be mentioned condensation products of formaldehyde with phenols, so-called phenoplasts, and condensation products of formaldehyde with urea, thiourea or melamine, so-called amino-plasts, and the polyesters used as surface-coating resins, either saturated, such as alkyd resins, or unsaturated, such as maleate resins; also linear polyesters and polyamides, poly-urethanes or silicones.

The said high molecular weight compounds may be present singly or in mixtures, in the form of plastic masses or melts. They may also be present in the form of their monomers or in the polymerised state in dissolved form as film-formers or binders for coatings or printing inks, such as, for example, boiled linseed oil, nitrocellulose, alkyd resins, melamine resins and urea-formaldehyde resins or acrylic resins.

Depending on the intended purpose, it proves advantageous to use the effect pigments or effect pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The effect pigments according to the invention can be added in any tinctorially effective amount to the high molecular weight organic material being pigmented. A pigmented composition comprising a high molecular weight organic material and from 0.01 to 80% by weight, preferably from 0.1 to 30% by weight, based on the high molecular weight organic material, of an effect pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations with the result that the latter can still be processed well.

For the purpose of pigmenting organic materials, the effect pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10% by weight, based on the high molecular weight organic material. The preferred combination of an effect pigment according to the invention with a coloured pigment of another colour, especially of a complementary colour, has especially high goniochromicity, colorations made using the effect pigment and colorations made using the coloured pigment having, at a measurement angle of 10°, a difference in hue ($\Delta H^*$) of from 20 to 340, especially from 150 to 210.

Preferably, the effect pigments according to the invention are combined with transparent coloured pigments, it being possible for the transparent coloured pigments to be present either in the same medium as the effect pigments according to the invention or in a neighbouring medium. An example of an arrangement in which the effect pigment and the coloured pigment are advantageously present in neighbouring media is a multi-layer effect finish.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymers, in customary amounts, before or after incorporation of the pigment in particular, in order to produce non-rigid shaped articles or to reduce their brittleness, it is desirable to add plasticisers, for example esters of phosphoric add, phthalic acid or sebacic acid, to the high molecular weight compounds prior to shaping. For pigmenting coatings and printing inks, the high molecular weight organic materials and the effect pigments according to the invention, where appropriate together with customary additives such as, for example, fillers, other pigments, siccatives or plasticisers, are finely dispersed or dissolved in the same organic solvent or solvent mixture, it being possible for the individual components to be dispersed or dissolved separately or for a number of components to be dispersed or dissolved together, and only thereafter for all the components to be brought together.

During dispersion of an effect pigment according to the invention in the high molecular weight organic material being pigmented and during processing of a pigment composition according to the invention, conditions under which only relatively weak shearing forces occur are preferably maintained so that the effect pigment will not be broken up into smaller fragments. Plastics comprising the pigment of the invention in amounts of 0.1 to 50% by weight, in particular 0.5 to 7% by weight in the coating sector, the pigments of the invention are employed in amounts of 0.1 to 10% by weight in the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight The colorations obtained, for example in plastics, coatings or printing inks, especially in coatings or printing inks, more especially in coatings, are distinguished by excellent properties, especially by extremely high saturation, outstanding fastness properties and high goniochromicity. When the high molecular weight material being pigmented is a coating, it is especially a speciality coating, most especially an automotive finish.

The pigments according to the invention are also suitable for making-up the lips or the skin and for colouring the hair or the nails.

The invention accordingly relates also to a cosmetic preparation or formulation comprising from 0.0001 to 90% by weight of the silicon/silicon oxide flakes and/or of a pigment according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations. The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eye-liners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecaneoxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminium.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat: depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers); suitable light-protection agents are, for example, organic UV absorbers from the class of the p-aminobenzoic acid derivatives, salicylic acid derivatives, benzophenone derivatives, dibenzoyl-methane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York, 1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper, skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers. If the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight The cosmetic preparations and formulations according to the invention may also be used for colouring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

The Examples that follow illustrate the invention without limiting the scope thereof. Unless otherwise indicated, percentages and parts are percentages and parts by weight, respectively.

EXAMPLES

Example 1

Under a high vacuum, a layer of $TiO_2$ (100 nm), a layer of SiO (100 nm) and a layer of $TiO_2$ (100 nm) are sublimated in that order onto a glass plate. One sample is used as a reference sample (Sample 1) and the other sample (Sample 2) is heated in a nitrogen atmosphere for 2 hours at 550° C.

The reflection spectra at 10 degrees and 65 degrees of Samples 1 and 2 are shown in FIG. 1. It will be apparent from FIG. 1 that calcining causes a change in the reflection maximum, but not in the reflection minimum, which points to a change in the refractive index at the $TiO_2$/SiO interface, which is presumably due to the reduction of $TiO_2$ by SiO.

The L*, a*, b*, c* and h values (CIELAB system) of Samples 1 and 2 are set out in the following Table:

| Sample | Calcining | Viewing angle [degrees] | L* | a* | b* | c* | h |
|---|---|---|---|---|---|---|---|
| 1 | no | 10 | 44.2 | 10.3 | 9.9 | 14.3 | 44.1 |
| 2 | yes | 10 | 45.5 | 16 | 14.6 | 21.7 | 42.3 |
| 1 | no | 65 | 65.7 | 11.6 | 15.4 | 19.3 | 52.9 |
| 2 | yes | 65 | 67.3 | 12 | 19.8 | 23.1 | 58.8 |

Example 2

$SiO_y$ flakes are made by sublimation of SiO under a vacuum of less than 0.1 Pa. The substrate is previously coated with 100 nm of a release layer of NaCl. The substrate is washed with deionised water, the obtained flakes are washed with deionised water in order to remove the NaCl and dried. White looking $SiO_y$ flakes having a thickness of 245 nm +/−5% are obtained. The $SiO_y$ flakes look blue under a microscope working with reflecting light. The amplitude of the maximum reflectivity in air is below 10%.

190 mg of the $SiO_y$ flakes are added to 44 ml deionised water and stirred in an ultrasonic bath during 10 minutes. The pH of the suspension is adjusted to 1.4 with 65% nitric acid. The suspension is then heated up to 75° C. and vigorously stirred while adding a total of 1 ml of $TiOCl_2$ during 60 minutes. The pH is kept constant at 1.4 by continuous addition of NaOH. The suspension is further stirred for 2 hours at 75° C. and then cooled and filtered. The obtained flakes are dried at 50° C. The $TiO_2$-coated $SiO_y$ flakes look yellow-green under the microscope working in back light mode. The same $TiO_2$-coated $SiO_y$ flakes look white-greenish in a transparent bottle. The powder is then heated at 700° C. for 2 hours in a vacuum of less than 10 Pa. After heating the $TiO_2$-coated $SiO_y$ flakes look bright green in a transparent bottle. Particles of the $TiO_2$-coated $SiO_y$ flakes look bright yellow-green with a maximum reflectivity above 20% under a microscope (working with reflecting light).

The invention claimed is:

1. A platelet-shaped pigment comprising a layer obtained by calcining TiO2 coated SiOy platelet in a non-oxidizing atmosphere, wherein $0.03 \leq y \leq 1.95$, or a platelet-shaped pigment obtained by calcining a TiO2 coated Ti, Zr, Cr, or Zn platelet in a non-oxidizing atmosphere at a temperature of more than 600° C.

2. A pigment according to claim 1, comprising
   (a) a substrate layer of SiOz, wherein $0.03 \leq z \leq 2.0$,
   (b) an intermediate layer obtained by calcining TiO2 coated SiOy platelet, wherein $0.03 \leq y \leq 1.95$, in a non-oxidizing atmosphere, and
   (c) a TiO2 layer.

3. A pigment according to claim 1, comprising
   (a) a multi-layered platelet-shaped substrate layer, wherein the substrate layer has a core of $SiO_{x1}$ which core has a layer of $SiO_{x2}$ $SiO_{y1}$ on the lower and upper surfaces, but not on the side faces,
   or the substrate layer has a core of $SiO_{x2}$ which core has a layer of $SiO_{x1}$ or $SiO_{y1}$ on the lower and upper surfaces, but not on the side faces,
   or the substrate layer has a core of $SiO_{y1}$ which core has a layer of $SiO_{x1}$ or $SiO_{x2}$ on the lower and upper surfaces, but not on the side faces,
   or the substrate layer has a core of a metal, which core has a layer of $SiO_{x1}$, $SiO_{x2}$ or a $SiO_{y1}$ on the lower and upper surfaces, but not on the side faces,
   (b) an intermediate layer obtained by calcining $TiO_2$/$SiO_{x1}$, $TiO_2$/$SiO_{x2}$, or $TiO_2$/$SiO_{y1}$ in a non-oxidizing atmosphere and
   (c) a TiO2 layer,
   wherein $0.03 \leq x1 < 0.70$, $0.70 \leq x2 \leq 0.99$, and $1.00 \leq y1 \leq 1.95$.

4. A pigment according to claim 2, wherein the substrate layer has a thickness of from 20 to 1000 nm.

5. A pigment according to claim 2, wherein the intermediate layer has a thickness of from 1 to 500 nm.

6. A pigment according to claim 2, wherein the $TiO_2$ layer has a thickness of from 1 to 200 nm.

7. A process for the production of a pigment, wherein
  (a) TiO$_2$-coated SiO$_y$ platelets, wherein 0.03≦y≦1.95, or TiO$_2$-coated Ti, Zr, Cr, or Zn platelets, are calcined in a non-oxidising gas atmosphere at a temperature of more than 600° C.

8. A cosmetic preparation, colorant, coating, printing ink, ink for security printing, plastic, textile, or glaze for ceramics and glass, comprising a pigment according to claim 1.

9. A platelet-shaped pigment according to claim 1, wherein 0.70≦y≦1.8.

10. A pigment according to claim 2, wherein 0.10≦z≦20.

11. A pigment according to claim 2, wherein 0.70≦z≦20.

12. A pigment according to claim 3, wherein the metal in the multi-layered platelet-shaped substrate layer having a core of a metal is Al.

13. A pigment according to claim 3, wherein 0.05≦x1≦0.50, 0.70≦x2≦0.99, and 1.1≦y1≦1.8.

14. A pigment according to claim 2, wherein the intermediate layer has a thickness of from 10 to 50 nm.

15. A pigment according to claim 2, wherein the TiO$_2$ layer has a thickness of from 10 to 100 nm.

16. A pigment according to claim 2, wherein the TiO$_2$ layer has a thickness of from 20 to 50 nm.

17. A process according to claim 7, wherein 0.70≦y≦1.8.

18. A process according to claim 7, wherein
  (a) TiO$_2$-coated SiO$_y$ platelets, wherein 0.03≦y≦1.95, are calcined in a non-oxidising gas atmosphere at a temperature of more than 600° C. and then
  (b) the TiO$_2$-coated SiO$_y$ platelets are treated at a temperature of more than 200° C., with air or another oxygen-containing gas.

19. A pigment prepared according to the process of claim 18.

20. A process according to claim 18, wherein in step (b) the TiO$_2$-coated SiO$_y$ platelets are treated at a temperature of more than 400° C., with air or another oxygen-containing gas.

* * * * *